United States Patent
Taguchi et al.

[11] Patent Number: 6,158,402
[45] Date of Patent: Dec. 12, 2000

[54] ENGINE BLOCK STRUCTURE IN MULTI-CYLINDER ENGINE

[75] Inventors: Takashi Taguchi; Sigemi Kobayashi; Toshinari Sonoda; Atsushi Iwamoto; Hirokazu Osaki; Shigemasa Kajiwara; Shigekazu Tanaka; Kazuo Shibata; Masashi Murata; Masahiko Tashiro; Sumiko Watanabe; Kazuhisa Ishizuka, all of Wako, Japan

[73] Assignee: Honda Giken Kogyo Kabushiki Kaisha, Tokyo, Japan

[21] Appl. No.: 09/161,302

[22] Filed: Sep. 28, 1998

[30] Foreign Application Priority Data

Oct. 3, 1997 [JP] Japan ................................ 9-270791
Oct. 3, 1997 [JP] Japan ................................ 9-271551
Oct. 3, 1997 [JP] Japan ................................ 9-271552

[51] Int. Cl.$^7$ ........................................... F02B 75/20
[52] U.S. Cl. ...................................................... 123/53.1
[58] Field of Search ........................... 123/52.1, 53.1, 123/59.6

[56] References Cited

U.S. PATENT DOCUMENTS

| | | | |
|---|---|---|---|
| 1,697,952 | 1/1929 | French | 123/294 |
| 3,766,894 | 10/1973 | Mize | 123/53.1 |
| 4,876,992 | 10/1989 | Sobotowski | 123/59.6 |
| 5,143,033 | 9/1992 | Catterson et al. | 123/193.3 |

FOREIGN PATENT DOCUMENTS

| | | |
|---|---|---|
| 4-17759 | 1/1992 | Japan. |
| 5-26100 | 2/1993 | Japan. |

*Primary Examiner*—Andrew M. Dolinar
*Attorney, Agent, or Firm*—Arent Fox Kinter Plotkin & Khan, PLLC

[57] ABSTRACT

In an engine block structure in a multi-cylinder engine in which a piston is incorporated from the side of a crank chamber into each of a plurality of cylinders disposed in series in a cylinder block, cylinder axes of the two adjacent cylinders are disposed to extend in such directions that they are gradually spaced apart from each other as proceeding from the side of a valve operating chamber toward the crank chamber as viewed from a direction of arrangement of the cylinders. Thus, a sufficient crankshaft bearing area can be ensured without bringing an increase in number of parts and an increase in size of the engine block.

22 Claims, 13 Drawing Sheets

ENGINE BLOCK STRUCTURE IN MULTI-CYLINDER ENGINE

BACKGROUND OF THE INVENTION

1. Field of the Invention

The present invention relates to an engine block structure in a multi-cylinder engine, including a cylinder block and a cylinder head, with pistons being assembled into a plurality of cylinders provided in series in the cylinder block by inserting the pistons from the side of a crank chamber.

2. Description of the Related Art

A multi-cylinder engine is conventionally disclosed, for example, in Japanese Patent Application Laid-open No. 4-17759, in which an engine block is formed into a so-called mono-block structure including a cylinder block and a cylinder head which are formed by molding integrally with each other. A multi-cylinder engine is also disclosed, for example, in Japanese Patent Application Laid-open No. 5-26100, in which a cylinder head and a cylinder liner are formed integrally with each other in an engine block.

In such multi-cylinder engine including the cylinder block and the cylinder head formed integrally with each other, or including the cylinder head and the cylinder liner formed integrally with each other, the incorporation of the pistons into the plurality of cylinders is obliged to be carried out from a lower side of the cylinders, i.e., from the side of the crankcase for the structural reason. For this reason, the multi-cylinder engine is conventionally contrived, so that the assembling of the pistons into the cylinders can be carried out, while ensuring sufficiently a bearing area necessary for the crankshaft. The engine described in Japanese Patent Application Laid-open No. 4-17759, has a structure in which the crankcase is divided into an upper case portion (bulkhead) and a lower case portion, and a notch of semi-circular section for preventing an interference at the time of insertion of the pistons into the cylinders is provided in the upper case portion. The engine described in Japanese Patent Application Laid-open No. 5-26100 has a structure in which the distance between sides of a portion of the cylinder block in which a main bearing for the crankshaft is disposed, is equal to or slightly larger than an inside diameter of a cylinder liner-inserted portion. However, the former suffers from a problem that a crank journal portion is divided into upper and lower parts and for this reason, the number of parts is increased, but also the assemblability is degraded. The latter suffers from another problem that the distance between cylinder bores is increased, and an increase in length of the engine block in the direction of arrangement of the cylinders cannot be avoided, thereby bringing about increases in size and weight of the engine block.

The crankshaft supporting structure in the prior art multi-cylinder engine is generally formed such that joint surfaces of a plurality of journal walls at a lower portion of the cylinder block and a plurality of bearing caps corresponding to these walls are fastened to each other by bolts perpendicular to the joint surfaces, as disclosed in Japanese Patent Application Laid-open No. 4-17759. In such structure, however, there is a possibility that the bearing cap and the journal wall may be misaligned laterally (i.e., in a direction along the joint surfaces) from each other due to a machining or working error and/or an assembling error and further due to a variation in axial tension during hot after the assembling and/or the like.

Further, the prior art multi-cylinder engine has a structure in which a bolt coupling the joint surfaces of the journal wall and the bearing cap to each other is tightened from the lower side of the bearing cap. However, if this bolt can be tightened from the upper side of the engine it may provide such an advantage that the bolt tightening operation can be easily carried out without hindrance, even when the space below the bearing cap is insufficient. Especially, a multi-cylinder engine having a bearing cap-integral type lower block structure in which a plurality of bearing caps are formed integrally with an oil pan body, has a superiority that the oil pan body is not a hindrance to the bolt tightening operation. However, if the bolt is perpendicular to the joint surfaces as in the conventional structure, it is necessary, in order to ensure that the bolt can be tightened from above (i.e., from outside the cylinder block), to increase the size of the bearing cap into which the bolt is screwed. Especially, as for the bearing cap located at an end in the direction of arrangement of the cylinders, the following disadvantage is encountered: the amount of protrusion of this bearing cap in an axial direction of extension of the crankshaft is increased, resulting in an increase in size of the engine block in the axial direction of the crankshaft.

SUMMARY OF THE INVENTION

Accordingly, it is an object of the present invention to provide a new engine block structure in a multi-cylinder engine, wherein the above-described problems can be solved.

To achieve the above object, according to a first aspect and feature of the present invention, there is provided an engine block structure in a multi-cylinder engine, comprising a cylinder block and a cylinder head, with pistons being incorporated into a plurality of cylinders provided in series in the cylinder block from the side of a crank chamber, wherein cylinder axes of two adjacent ones of the cylinders extend in such directions that the cylinder axes are gradually spaced apart from each other as proceeding from a valve operating chamber toward the crank chamber as viewed from a direction of arrangement of the cylinders. With such feature, a sufficient crankshaft bearing area can be ensured without bringing about an increase in number of parts and an increase in size of the engine block.

According to a second aspect and feature of the present invention, in addition to the first feature, the cylinder block and the cylinder head are formed into an integral structure. With such feature, the first feature can be applied to the engine block comprising a so-called mono-block comprised of the cylinder block and cylinder head formed by molding integrally with each other. Therefore, the number of parts can be further decreased.

According to a third aspect and feature of the present invention, in addition to the first or second feature, the cylinder axes of the two adjacent ones of the cylinders intersect each other on an axial center of a valve operating cam shaft of a valve operating mechanism provided in the cylinder head. With such feature, the cylinder head section can be made compact, and also the structure of the valve operating mechanism itself can be simplified.

According to a fourth aspect and feature of the present invention, in addition to the first feature, an oil return passage or a blow-by gas passage is defined in the cylinder block on a side of a crankshaft opposite the cylinders. With this feature, the desired passage can be easily formed without provision of a wasteful wall in the cylinder block, and the strength of the engine block cannot be partially injured despite the formation of the passage.

According to a fifth aspect and feature of the present invention, in addition to the first or second feature, an arcuate recess that allows passing of the piston through the recess is defined in each of journal walls of the cylinder block supporting a crankshaft in order to assemble the piston into each of the cylinders from the side of the crank chamber. With this feature, a necessary crankshaft bearing area can be ensured without bringing about an increase in size of the cylinder block in the direction of arrangement of the cylinders.

According to a sixth aspect and feature of the present invention, in addition to the first feature, a reinforcing rib is integrally provided on a sidewall of the cylinder block for coupling at least the two adjacent cylinders to each other. With such feature, the rigidity of the cylinder block can be enhanced as compared with the conventional engine.

According to a seventh aspect and feature of the present invention, in addition to the first feature, joint surfaces of at least a part of journal walls integrally provided at a lower portion of the cylinder block and bearing caps coupled to lower ends of the walls are fastened to each other by a plurality of bolts passing through the joint surfaces; a crankshaft is rotatably supported between the joints surfaces; and a positioning pin or step is provided between the joint surfaces of each of the journal walls and each of the bearing caps for positioning the journal wall and the bearing cap relative to each other in a direction along the joint surfaces, at least one of the bolts being inclined with respect to a line perpendicular to the joint surfaces, so that a lateral component of a bolt tightening force acts on the positioning pin or step. With this feature, the positioning function of the positioning pin or step can be effectively exhibited based on the lateral component of the bolt tightening force to properly position the journal wall and the bearing cap in the direction along the joint surface. Moreover, the positioning structure using such positioning pin or step can be relatively easily formed by machining with a simple construction and with a reduced number of parts, leading to a very good mass-productivity.

According to an eighth aspect and feature of the present invention, in addition to the first feature, joint surfaces of at least a part of journal walls integrally provided at a lower portion of the cylinder block and bearing caps coupled to lower ends of the walls are fastened to each other from above the outside of the cylinder block by a plurality of bolts passing through the joint surfaces; a crankshaft is rotatably supported between the joints surfaces; and a positioning pin or step is provided between the joint surfaces of each of the journal walls and each of the bearing caps for positioning the journal wall and the bearing cap relative to each other in a direction along the joint surfaces, at least one of the bolts being inclined downwards in an inward direction of the engine with respect to a line perpendicular to the joint surfaces, so that a lateral component of a bolt tightening force acts on the positioning pin or step. With this feature, the positioning function of the positioning pin or step can be effectively exhibited based on the lateral component of the bolt tightening force to properly position the journal wall and the bearing cap in the direction along the joint surface. In addition, the positioning structure using such positioning pin or step can be relatively easily formed by machining with a simple construction and with a reduced number of parts, leading to a very good mass-productivity. Moreover, the tightening of the bolts from above the outside of the cylinder block can be easily achieved, leading to a good workability, and the bearing cap can be reduced in size to the utmost in a direction traversing the crankshaft by the bolt being inclined downwards in the inward direction of the engine with respect to the line perpendicular to the joint surfaces.

According to a ninth aspect and feature of the present invention, in addition to the eight feature, the bearing caps are integrally coupled to an oil pan body, and at least one of the bolts is disposed at a location nearer the crankshaft than the coupled portion of the bearing cap. With this feature, a sufficient wall thickness of an outer portion of the bearing cap from a threaded portion thereof (i.e., a portion extending to the coupled portion) can be ensured by virtue of the inclination of the bolt. Therefore, the rigidity of the coupled portion can be enhanced, and the support rigidity to the crankshaft can also be enhanced.

According to a tenth aspect and feature of the present invention, in addition to the first feature, a plurality of journal walls are arranged at distances in a direction of arrangement of the cylinders and connected to a lower portion of the cylinder block, lower ends of the plurality of journal walls being coupled to a plurality of bearing caps corresponding to the journal walls, respectively; a crankshaft is rotatably supported between the joint surfaces of said journal walls and said bearing caps, the joint surfaces of the journal wall located at least at one end in the direction of arrangement of the cylinders and the bearing cap are coupled to each other from above by one of the bolts which is inclined downwards in an inward direction of the engine with respect to a line perpendicular to the joint surfaces. With this feature, even if the bolt is tightened from above in order to provide a convenience to a bolt tightening operation, the outward protrusion of the bearing cap in a direction of extension of the crankshaft can be suppressed to the utmost by the inclination of the bolt. Therefore, it is possible to reduce the size of the bearing cap in an axial direction of the crankshaft.

According to an eleventh aspect and feature of the present invention, in addition to the tenth feature, all the joint surfaces of the bearing caps and the journal walls corresponding to the bearing caps are tightened from above by the bolts which are inclined downwards in the inward direction of the engine with respect to the line perpendicular to the joint surfaces.

With this feature, even if the bolts for all the bearing caps are tightened from above in order to provide a convenience to a bolt tightening operation, the outward protrusion of all the bearing caps in the direction of extension of the crankshaft or in a direction traversing the crankshaft can be suppressed to the utmost by the inclination of all the bolts. Therefore, a reduction in size of all the bearing caps is provided.

According to a twelfth aspect and feature of the present invention, in addition to the tenth feature, one end face of an engine body including the cylinder block and the cylinder head is covered with a chain case in which a chain transmitting mechanism for driving auxiliaries is accommodated; a bolt boss corresponding to an outer periphery of a shank of the bolt is projectingly provided on an outer surface of the bearing cap facing the inside of the chain case; and a chain guide is mounted to the bolt boss. With this feature, the chain guide can be firmly supported, and the protrusion of the guide in an outward direction of the crankshaft can be suppressed to the utmost, which contributes to a reduction in size of the engine in the outward direction of the crankshaft.

According to a thirteenth aspect and feature of the present invention, in addition to the tenth feature, the bearing cap located at least at one end in the direction of arrangement of the cylinders includes a plurality of bolt bosses corresponding to outer peripheries of shanks of the plurality of bolts, respectively, and a rib interconnecting the bolt bosses, the bolt bosses and the rib being projectingly provided on an outer surface of such bearing cap. With this feature, since the plurality of bolt bosses projectingly provided on the outer surface of the bearing cap located at least at one end in the direction of arrangement of the cylinders are interconnected by the rib projectingly provided on such outer surface, the support rigidity of the bolt bosses on the bearing cap to the bolt is enhanced, leading to an enhanced strength of coupling by the bolt.

According to a fourteenth aspect and feature of the present invention, in addition to the tenth feature, the journal wall located at least at one end in the direction of arrangement of the cylinders includes a plurality of bolt bosses which correspond to outer peripheries of shanks of the plurality of bolts and whose upper ends serve as bolt seat faces, and a rib interconnecting the bolt bosses, the bolt bosses and the ribs being projectingly provided on an outer surface of such journal wall. With this feature, because the plurality of bolt bosses projectingly provided on the outer surface of the journal wall located at least at one end in the direction of arrangement of the cylinder are interconnected by the rib, the support rigidity of the bolt bosses on the journal wall to the bolt is enhanced, leading to an enhanced strength of coupling by the bolt.

The above and other objects, features and advantages of the invention will become apparent from the following description of the preferred embodiment taken in conjunction with the accompanying drawings.

DETAILED DESCRIPTION OF THE PREFERRED EMBODIMENTS

Figure 1:
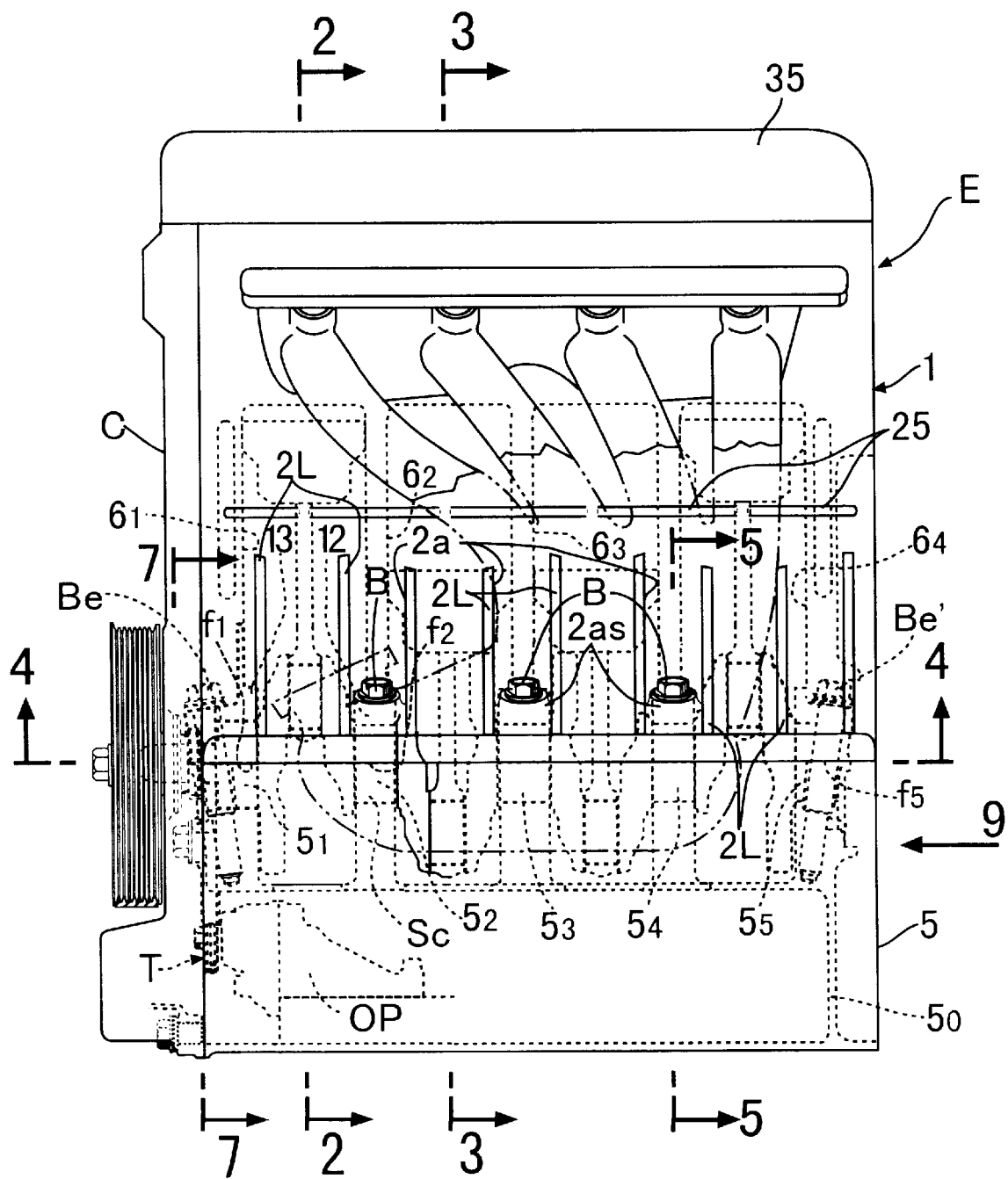
FIG. 1 is a side view of an engine according to a first embodiment of the present invention.

A first embodiment of the present invention will now be described with reference to FIGS. 1 to 10. An engine body E of an in-line type 4-cylinder and 4-cycle engine is comprised of a mono-block 1 including a cylinder block 2 and a cylinder head 3 which are formed by molding integrally with each other, and a lower block 5 which is integrally coupled to a lower surface of the mono-block 1 by a plurality of connecting bolts Be, B, Be' with a packing interposed therebetween. The lower block 5 is formed by integrally coupling a plurality of bearing caps $5_1$, $5_2$, $5_3$, $5_4$ and $5_5$ arranged in an axial direction of a crankshaft Sc to an upper portion of an oil pan body $5_0$ in a seamless manner. A baffle plate 22 is integrally formed between the bearing caps $5_1$ to $5_5$ and the oil pan body $5_0$ for partitioning them from each other.

The cylinder block 2 is comprised of a cylinder barrel section 2b and a crankcase section 2c. A crank chamber 7 having the crankshaft Sc accommodated therein is defined by the crankcase section 2c and an upper portion of the lower block 5, and a valve operating chamber 8 having a valve operating mechanism Mv which will be described hereinafter is defined in the cylinder head 3.

Figure 4:
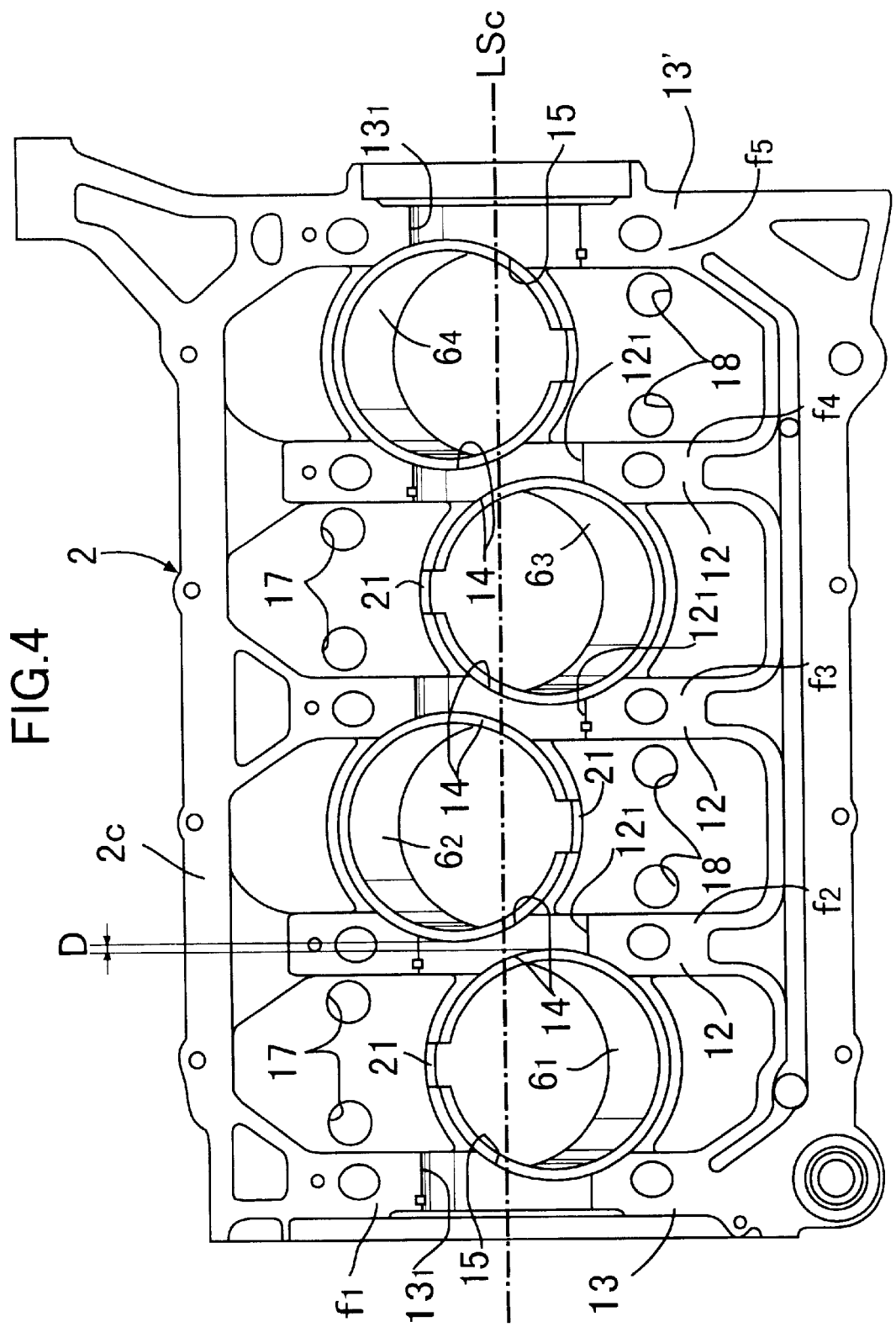
FIG. 4 is a bottom view of an engine block, taken along a line 4—4 in FIG. 1.

Four first, second, third and fourth cylinders $6_1$, $6_2$, $6_3$ and $6_4$ are provided in series in the axial direction of the crankshaft in the cylinder barrel section $2_b$. Axes of the two cylinders adjacent to each other as viewed from a direction of arrangement of the cylinders $6_1$ to $6_4$ extend, so that they intersect each other on the side of the valve operating chamber 8 and so that they are spaced apart from each other on the side of the crank chamber 7. Ends of the four cylinders $6_1$ to $6_4$ on the side of the crank chamber 7 are disposed in a zigzag fashion as viewed from a lower surface of the cylinder block 2, as shown in FIG. 4. Thus, it is possible to carry out an operation of assembling a piston P into each of the cylinders $6_1$ to $6_4$ from the side of the crank chamber 7, while ensuring a sufficient bearing area of the crankshaft Sc, as described hereinafter.

Figure 2:
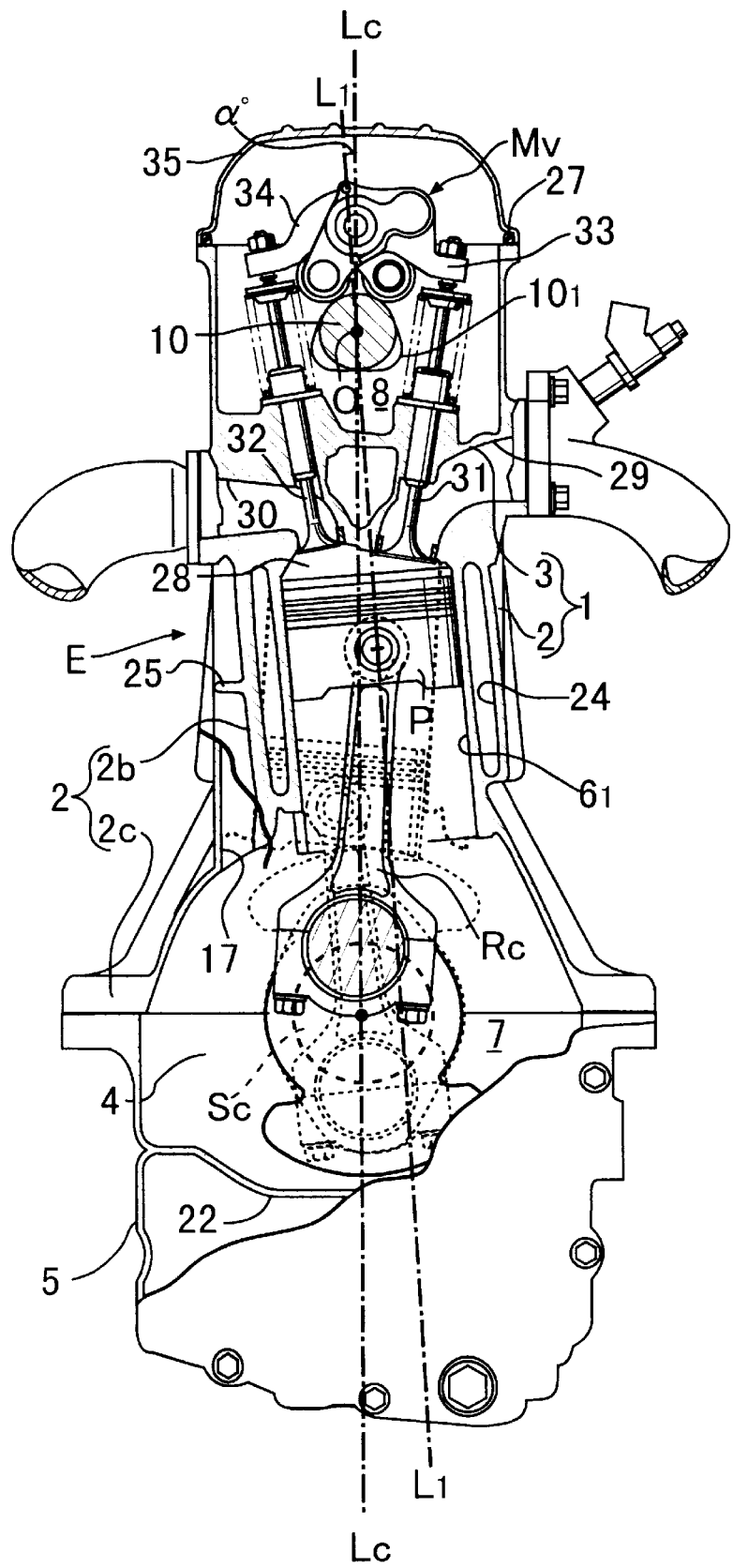
FIG. 2 is a longitudinal sectional view of the engine, taken along a line 2—2 in FIG. 1.
Figure 3:
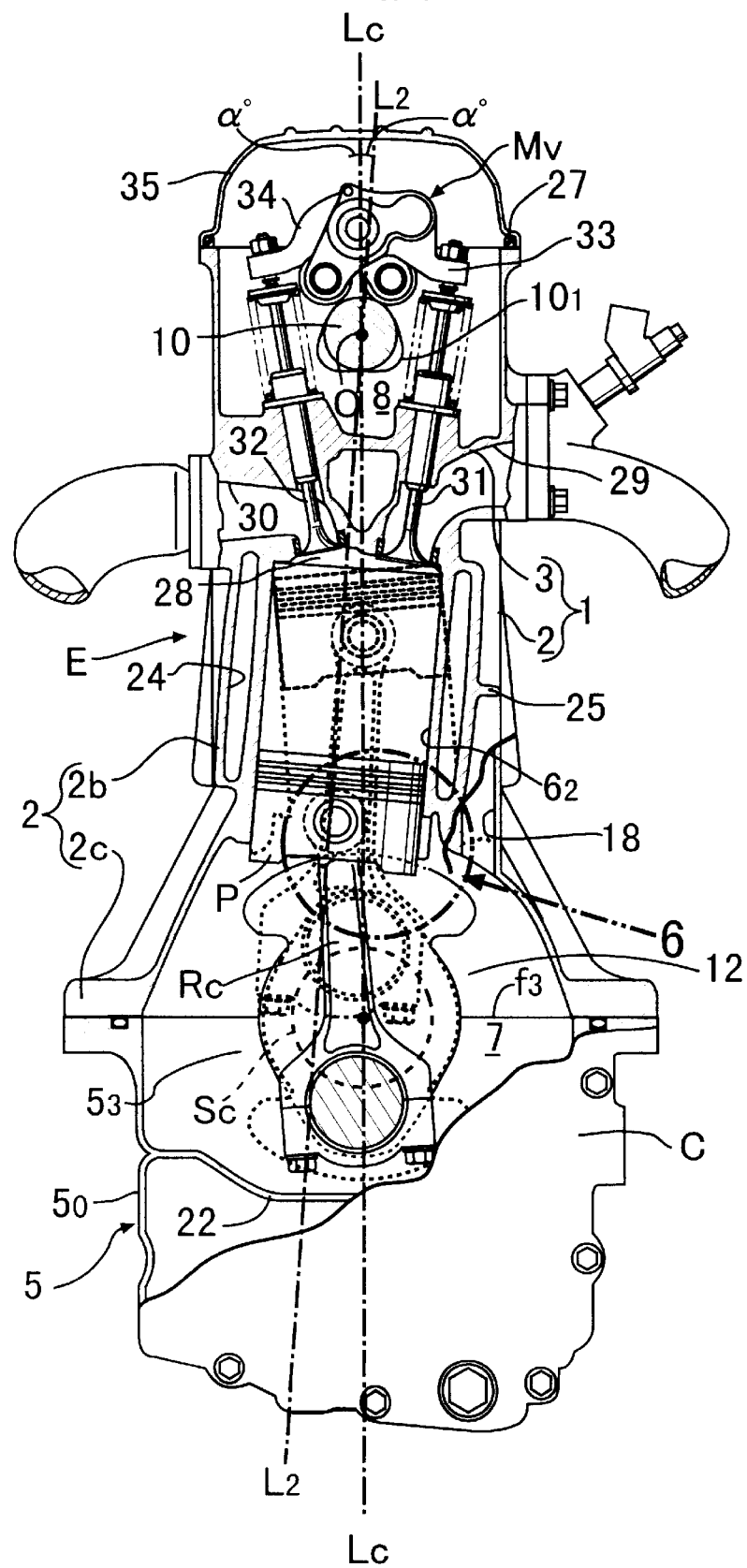
FIG. 3 is a longitudinal sectional view of the engine, taken along a line 3—3 in FIG. 1.

The relative positional relationship between the first and second cylinders $6_1$ and $6_2$ selected as the two adjacent cylinders will be described in detail mainly with reference to FIGS. 2 to 4. A first cylinder axis $L_1$ passing through an axial center of the first cylinder $6_1$ and a second cylinder axis $L_2$ passing through an axial center of the second cylinder $6_2$ extend in directions away from each other from the upper to the lower, i.e., from the side of the valve operating chamber 8 toward the crank chamber 7 as viewed from the axial direction of the crankshaft, i.e., from the direction of arrangement of the four cylinders $6_1$ to $6_4$. The first and second cylinder axes $L_1$ and $L_2$ are inclined at $\alpha°$ in opposite directions with respect to an axial center line Lc connecting an axial center of the crankshaft Sc and an axial center of a valve operating cam shaft 10. The first and second cylinder axes $L_1$ and $L_2$ intersect each other on the axial center O of the valve operating cam shaft 10.

Due to the cylinder axes of the two adjacent cylinders, e.g., the first and second cylinder axes $L_1$ and $L_2$ of the first and second cylinders $6_1$ and $6_2$ being in an arrangement relationship as described above, those lower ends of the four first, second, third and fourth cylinders $6_1$, $6_2$, $6_3$ and $6_4$ which face the crank chamber 8 are laterally staggered and disposed in a zigzag fashion with a crankshaft axis LSc of the crankshaft Sc interposed therebetween, as shown in FIG. 4.

As shown in FIG. 4, intermediate journal walls 12 . . . , are formed in the crankcase section 2c forming lower half of the cylinder block 2 between the every adjacent cylinders, i.e., between the first and second cylinder $6_1$ and $6_2$, between the second and third cylinders $6_2$ and $6_3$ and between the third and fourth cylinders $6_3$ and $6_4$, respectively, and end journal walls 13 and 13' are formed on outer walls of the first and fourth cylinders, i.e., on lengthwise opposite end walls of the cylinder block 2. Semi-circular bearing halves $12_1$ . . . , and $13_1$, $13_1$ are formed on lower end faces of the intermediate and end journal walls 12 . . . , 13 and 13' for supporting the crankshaft Sc, respectively. Recesses 14, 14 having an arcuate cross section are defined in opposite sides of each of the intermediate journal walls 12 ..., so that they are staggered on opposite sides of the crankshaft axes LSc. Arcuate portions of the adjacent cylinders, e.g., the first and second cylinders $6_1$ and $6_2$ are received in and integrally formed with the recesses 14, 14 and a recess 15 having an arcuate cross section is also defined in an inner side of each of the end journal walls 13 and 13', so that it is offset to one side of the crankshaft axis LSc. An arcuate portion of the cylinder at each of the opposite ends, e.g., the first cylinder $6_1$ is received in and integrally formed with the recess 15.

Due to the ends of the first to fourth cylinders $6_1$ to $6_4$ facing the crank chamber 8 being disposed on the opposite sides of the crankshaft axis LSc in the zigzag fashion with the crankshaft axis LSc interposed therebetween, as described above, the necessary bearing areas of the intermediate and end journal walls 12 ..., 13 and 13' can be ensured, while reducing a distance D between the two adjacent cylinders, e.g., the first and second cylinders $6_1$ and $6_2$. Moreover, the ends of the first to fourth cylinders $6_1$ to $6_4$ open into the crank chamber 8, and the piston P can be inserted from the crank chamber 8 into the each of the cylinders to provide an assembly.

Upper end faces of the bearing caps $5_2$ to $5_4$, $5_1$ and $5_5$ are integrally coupled to the lower end faces of the intermediate and end journal walls 12 ..., 13 and 13' by pairs of left and right bolts B, B, Be, Be and Be', Be' with the crankshaft Sc interposed between each pair of bolts. Semi-circular bearing halves $5a_2$ to $5a_4$, $5a_1$ and $5a_5$ corresponding to the bearing halves $12_1$ ... and $13_1$, $13_1$ of the journal walls 12 ..., 13 and 13' are formed on the upper end faces of the bearing caps $5_2$ to $5_4$, $5_1$ and $5_5$, respectively, and the crankshaft Sc is rotatably supported between the upper and lower bearing halves.

Figure 5:
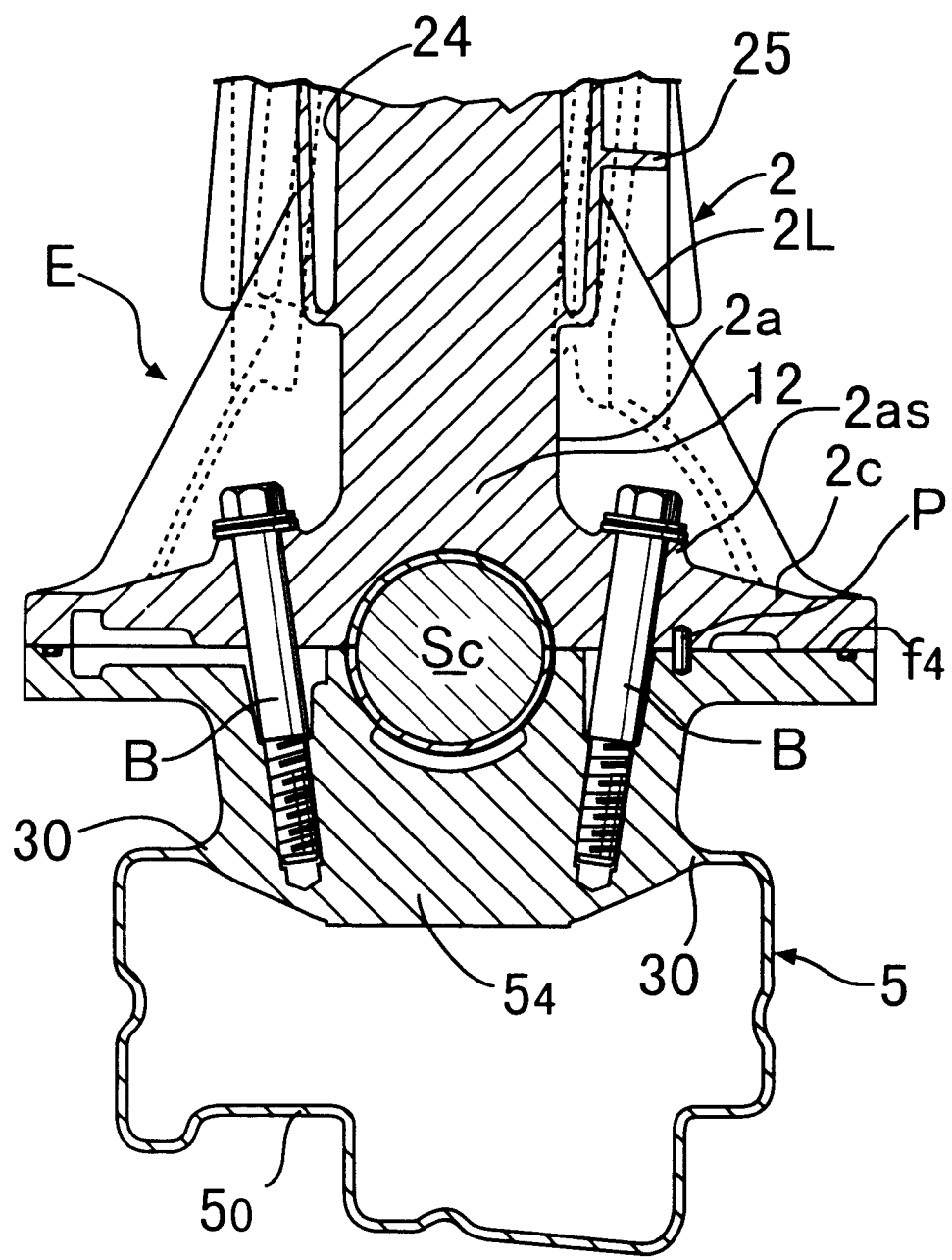
FIG. 5 is a partial sectional view of the engine block, taken along a line 5—5 in FIG. 1.

As also shown in FIG. 5, the pair of left and right bolts B, B which integrally fasten substantially horizontal joint surfaces $f_2$, $f_3$, $f_4$ of each of the intermediate journal walls 12 and each of the corresponding bearing caps $5_2$ to $5_4$ to each other, are arranged so that they are inclined downwards in an inward direction of the engine with respect to a line perpendicular to each of the joint surfaces $f_2$ to $f_4$ (inclined downwards toward the center of the engine within a vertical plane perpendicular to the axis of the crankshaft Sc in the illustrated embodiment) in such a manner that they can be tightened from outside and above of the cylinder block 2. The inclination of the bolts B, B ensures that the left and right opposite sides of each of the bearing caps $5_2$ to $5_4$, into which the bolts are screwed, extend substantially along inclined axes of the bolts. Therefore, even if the bolts B, B are tightened from above, the outward protrusion of each of the bearing caps $5_2$ to $5_4$ in a lateral direction (a direction traversing the crankshaft Sc) is suppressed to the utmost and hence, each of the caps $5_2$ to $5_4$ can be correspondingly reduced in size in such direction. Threaded shanks of the bolts B, B are disposed nearer the crankshaft Sc than a coupled portion 30 between each of the intermediate bearing caps $5_2$ to $5_4$ and the oil pan body $5_0$, but a sufficient wall thickness of that portion of each of the bearing caps $5_2$ to $5_4$ which is outer from the threaded portion (i.e., a portion extending to the coupled portion 30) can be ensured due to each of the bolts B being inclined as described above. Therefore, the rigidity of the coupled portion 30 is enhanced, and the support rigidity of the cap to the bolt B is also enhanced, thereby enabling the crankshaft Sc to be stably supported.

One positioning pin P is removably provided between the joint surfaces $f_2$, $f_3$, $f_4$ of each of the intermediate journal walls 12 and the corresponding bearing caps $5_2$, $5_3$, $5_4$ to extend perpendicularly through the joint surfaces $f_2$, $f_3$, $f_4$ on one side of the crankshaft Sc for positioning the journal wall 12 and the bearing caps $5_2$, $5_3$, $5_4$ in a direction along the joint surfaces $f_2$, $f_3$, $f_4$ (particularly in a direction traversing the crankshaft Sc). Since the bolt B near the pin P is inclined as described above, a lateral (direction along the joint surface f) component of the bolt tightening force acts on the positioning pin P. In other words, the lateral component of the bolt tightening force works on the positioning pin P to intensify the engaging force between the positioning pin P and the journal wall 12 as well as the bearing caps $5_2$, $5_3$, $5_4$, whereby the function of positioning the pin P can be effectively exhibited. Therefore, both of the journal wall 12 and the bearing caps $5_2$, $5_3$, $5_4$ can be always properly positioned in the direction along the joint surfaces $f_2$, $f_3$, $f_4$.In In assembling the engine, the bolt B nearer the positioning pin P is tightened prior to the other (i.e., farther from the pin P) bolt B in the joint surfaces $f_2$, $f_3$, $f_4$ between the intermediate journal wall 12 and the bearing caps $5_2$, $5_3$, $5_4$, thereby effectively exhibiting the positioning action by the pin P.

Recesses 2a corresponding to each of the intermediate journal walls 12 ... are defined in opposite outer sides of the cylinder block 2 between a pair of longitudinal ribs 2L, 2L on such outer sides, respectively, and a bolt seat surface 2as for receiving the head of the bolt B is formed on a bottom of the recess 2a. The special provision of such recess 2a and seat surface 2as ensures that the operation of tightening the bolt B can be carried out without hindrance also from above the opposite sides of the cylinder block 2 without useless increase in length of the bolt B.

One end face of the engine body E is covered with a chain case C bolted to the body E. A chain transmitting mechanism T for driving auxiliaries is accommodated within the case C, and in the illustrated embodiment, a hydraulic pump OP within the oil pan is operatively connected to the crankshaft Sc by the mechanism T. The opening end of the oil pan body $5_0$ in the lower block 5 is closed by the chain case C and hence, the oil pan is constituted by a lower portion of the case C and the oil pan body $5_0$.

One of the end journal walls 13 and the corresponding bearing cap $5_1$ face the inside of the chain case C. The pair of left and right bolts Be, Be disposed on the opposite sides of the crankshaft Sc to fasten the joint surfaces $f_1$ of the end journal wall 13 and the bearing cap $5_1$ to each other are inclined downwards in the inward direction of the engine with respect to the line perpendicular to the joint surfaces $f_1$ (inclined downwards toward the center of the engine within the vertical plane parallel to the axis of the crankshaft Sc in the illustrated embodiment). A pair of bolt bosses 5b, 5b are integrally formed in a bulging manner on an outer surface of the bearing cap $5_1$, and inclined substantially along the axes of the shanks of the left and right bolts Be, Be in correspondence to outer peripheries of the shanks of the left and right bolts Be, Be, respectively. A pair of bolt bosses 13b, 13b are integrally formed in a bulging manner on the one end journal wall 13, and inclined in a similar manner and connected to upper ends of the bolt bosses 5b, 5b, respectively. Upward and outward inclined upper end faces of the bolt bosses 13b, 13b of the end journal wall 13 serve as the bolt seat surfaces receiving the heads of the bolts Be. Further, a connecting rib 13L is integrally provided in a protruding manner on the outer surface of the end journal wall 13 to extend in a substantially arcuate shape along an outer periphery of the crankshaft Sc in order to integrally connect both of the bolt bosses 13b, 13b to each other. The special provision of the rib 13L enhances the support rigidity of the end journal wall 13 to the bolt Be.

A pair of left and right guide bosses 5g, 5g and a rib 5L are integrally provided in a protruding manner on an outer surface of the bearing cap $5_1$. The pair of left and right guide bosses 5g, 5g are superposed on lower portions of the bolt bosses 5b, 5b, and the rib 5L extends substantially horizontally to integrally connect both of the bolt bosses 5b, 5b to each other directly or through the guide boss 5g. Thus, the support rigidity of the bearing cap $5_1$ to the bolt Be is enhanced by virtue of the rib 5L. In addition, a chain guide G for guiding a chain of the chain transmitting mechanism T is mounted on each of the guide bosses 5g and hence, the mounted rigidity of the chain guide G is also enhanced. The inclined arrangement of the bolts Be, Be as described above ensures that the outer surface of the bearing cap $5_1$ (in the illustrated embodiment, the outer surface of the bolt boss 5b) can be inclined substantially along the axis of the bolt Be and hence, the outward protrusion of the cap $5_1$ in the direction of extension of the crankshaft Sc is suppressed to the utmost.

On the other hand, a mission case of a transmission (not shown) can be coupled to the other end face of the engine body E. The pair of left and right bolts Be', Be' fastening the joint surface $f_5$ of the other end journal wall 13' facing the mission case and the corresponding bearing cap $5_5$ to each other are inclined downwards in the inward direction of the engine with respect to a line perpendicular to the joint surfaces $f_5$ (inclined downwards toward the center of the engine within the vertical plane parallel to the axis of the crankshaft Sc in the illustrated embodiment). A pair of bolt bosses 5b', 5b' are integrally formed in a bulging manner on an outer surface of the bearing cap $5_5$, and inclined substantially along the axes of the shanks of the left and right bolts Be' in correspondence to outer peripheries of the shanks of the left and right bolts Be', Be', respectively. A pair of bolt bosses 13b', 13b' are integrally formed in a bulging manner on the other end journal wall 13', and inclined in a similar manner and connected to upper ends of the bolt bosses 5b', 5b', respectively. Upward and outward inclined upper end faces of the bolt bosses 13b', 13b' of the end journal wall 13' serve as the bolt seat surfaces receiving the heads of the bolts Be'. Further, a connecting rib 13L' is integrally provided in a protruding manner on the outer surface of the end journal wall 13' to extend in a substantially arcuate shape along the outer periphery of the crankshaft Sc in order to integrally connect both of the bolt bosses 13b', 13b' to each other. The special provision of the rib 13L' enhances the support rigidity of the end journal wall 13' to the bolt Be'.

A rib 5L' is integrally provided in a protruding manner on the outer surface of the bearing cap $5_5$ and extends in a substantially arcuate shape along the outer periphery of the crankshaft Sc to integrally connect lower portions of the bolt bosses 5b', 5b' to each other. Thus, the support rigidity of the bearing cap 55 to the bolt Be' is enhanced by virtue of the rib 5L'. The inclination of the bolts Be', Be' as described above ensures that the outer surface of the bearing cap $5_5$ (the outer surface of the bolt boss 5b' in the illustrated embodiment) can be inclined substantially along the axis of the bolt Be' and hence, the outward protrusion of the cap $5_5$ in the direction of extension of the crankshaft Sc is suppressed to the utmost.

As shown in FIG. 4, a plurality of oil return passages 17 and a plurality of blow-by gas passages 18 are provided alternately in an opposed relation to the four cylinders $6_1$ to $6_4$ in the wall of the mono-block 1 at locations opposed to the cylinders $6_1$ to $6_4$ and spaced apart from the crankshaft Sc. More specifically, the two oil return passages 17, 17 are provided in the wall of the mono-block 1 in correspondence to the first and third cylinders $6_1$ and $6_3$, and the two blow-by gas passages 18, 18 are provided in the wall of the mono-block 1 in correspondence to the second and fourth cylinders $6_2$ and $6_4$. Such arrangement enables passage areas of the oil return passages 17 and the blow-by gas passages 18 to be ensured relatively with a margin, and it is unnecessary to specially form a wasteful wall in the mono-block 1 in order to form those passages. An upper end of the oil return passage 17 opens into the valve operating chamber 8, and a lower end of the oil return passage 17 opens into the oil pan 5. An upper end of the blow-by gas passage 18 opens into a breather chamber which is not shown, and a lower end of the blow-by gas passage 18 opens into the crank chamber 7.

A connecting rod Rc is rotatably connected at its larger-diameter end to each of a plurality of crank pins of the crankshaft Sc, as usual, and a piston pin of the piston P slidably received into each of the cylinders $6_1$ to $6_4$ from the side of the crankcase 8 as described above is rotatably connected to a smaller-diameter end of each of the connecting rods Rc.

Figure 6:
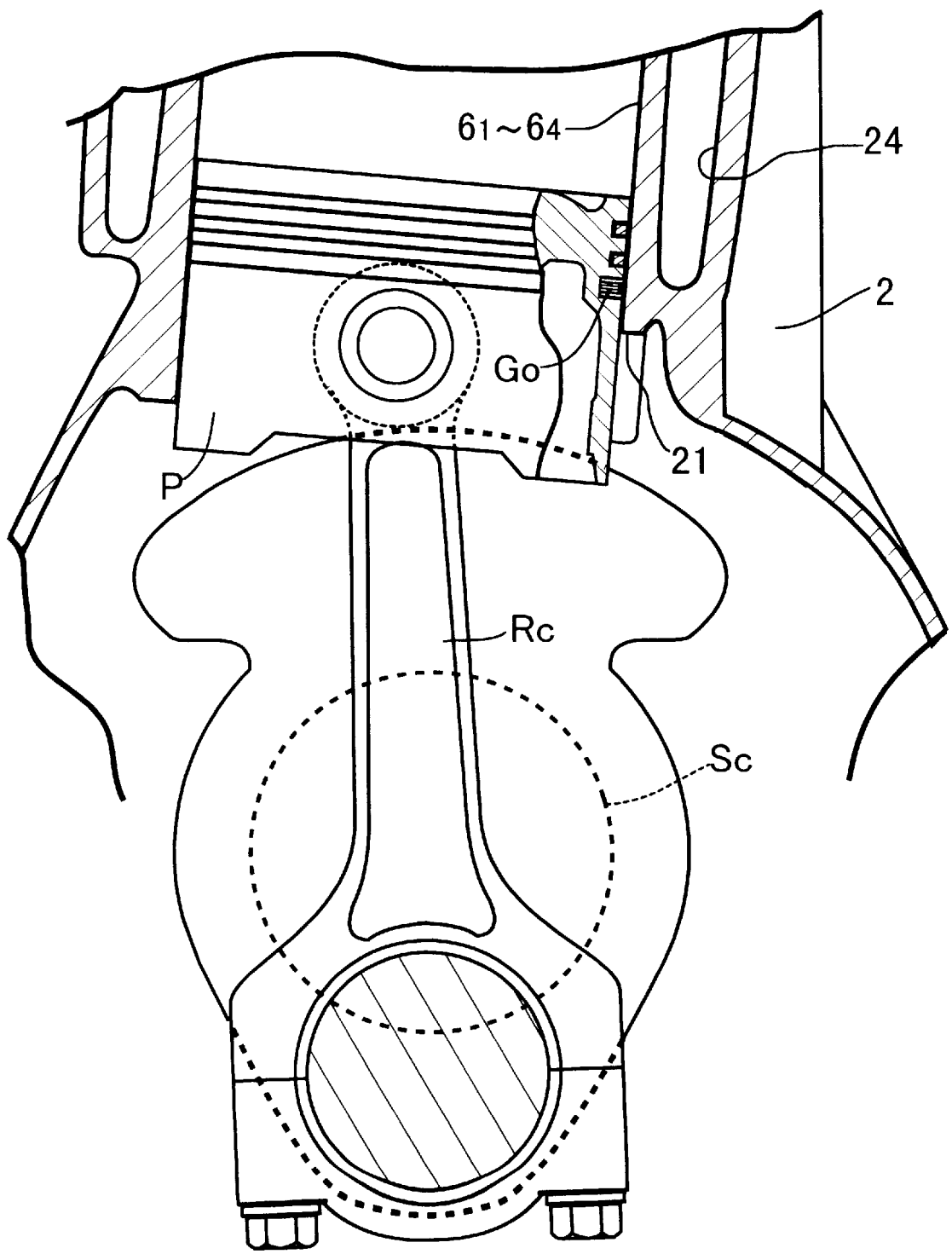
FIG. 6 is an enlarged view of a portion indicated by an arrow 6 in FIG. 3.
Figure 7:
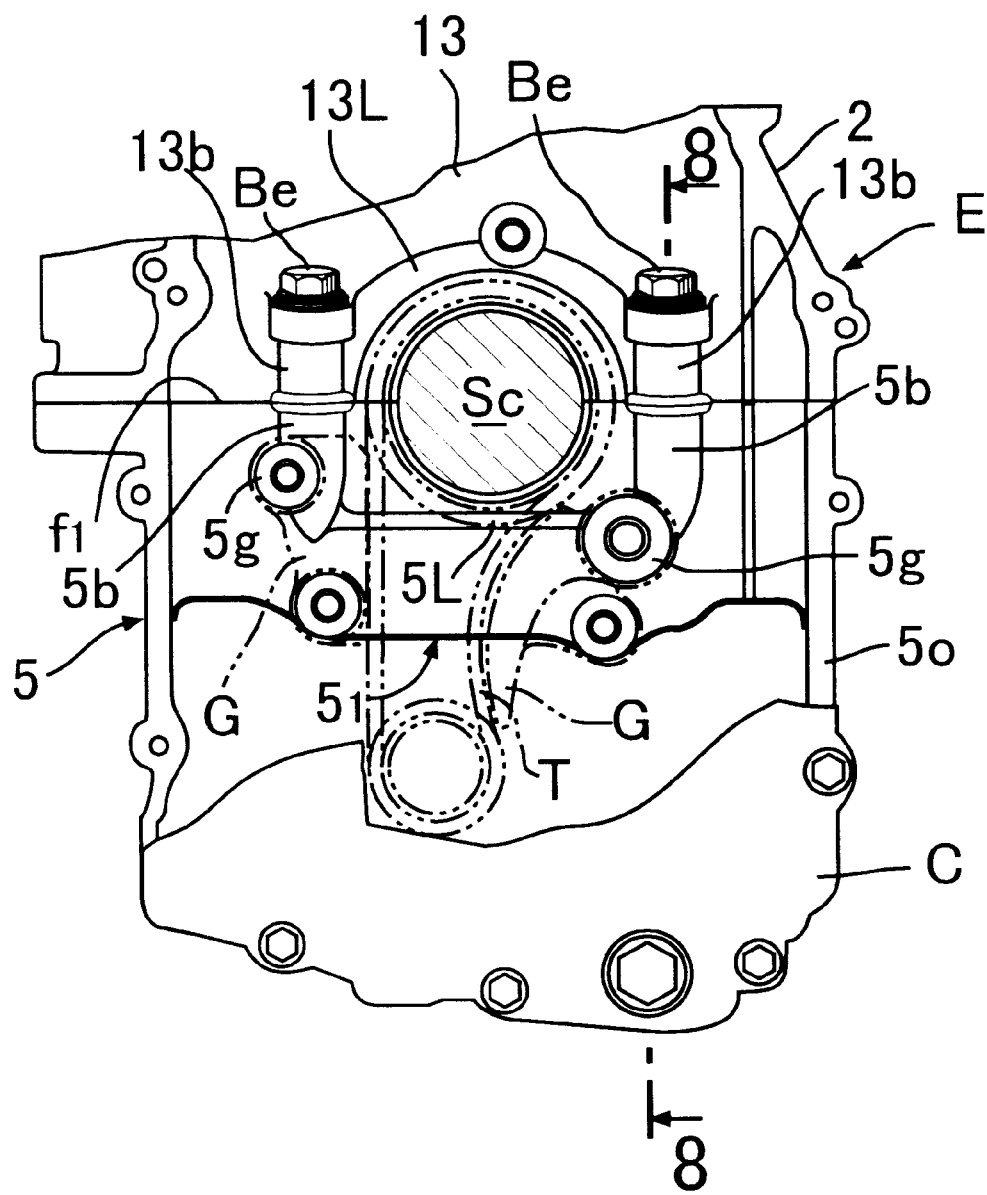
FIG. 7 is a longitudinal sectional view of the engine, taken along a line 7—7 in FIG. 1.
Figure 8:
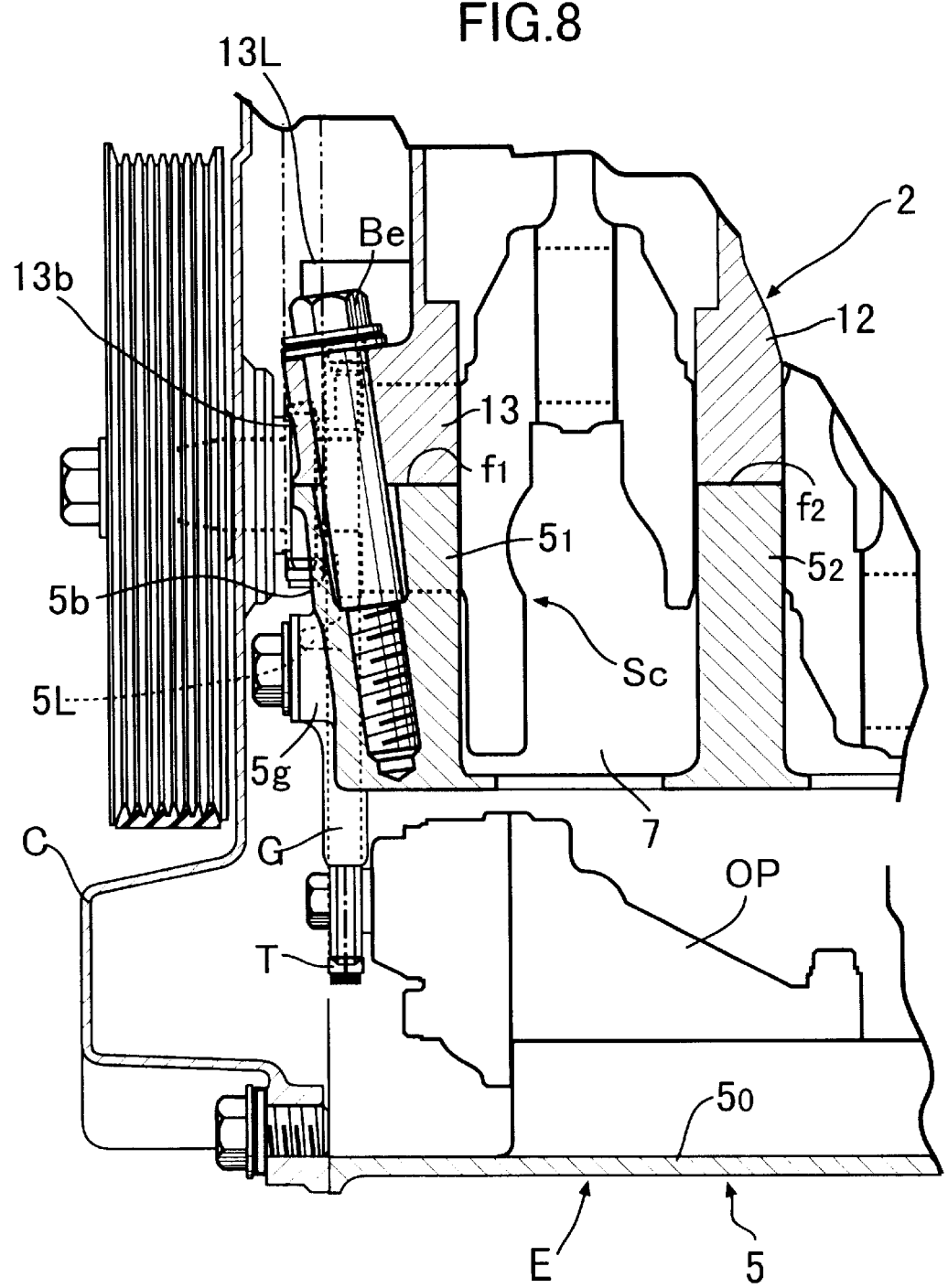
FIG. 8 is a partially enlarged sectional view of the engine, taken along a line 8—8 in FIG. 7.
Figure 9:
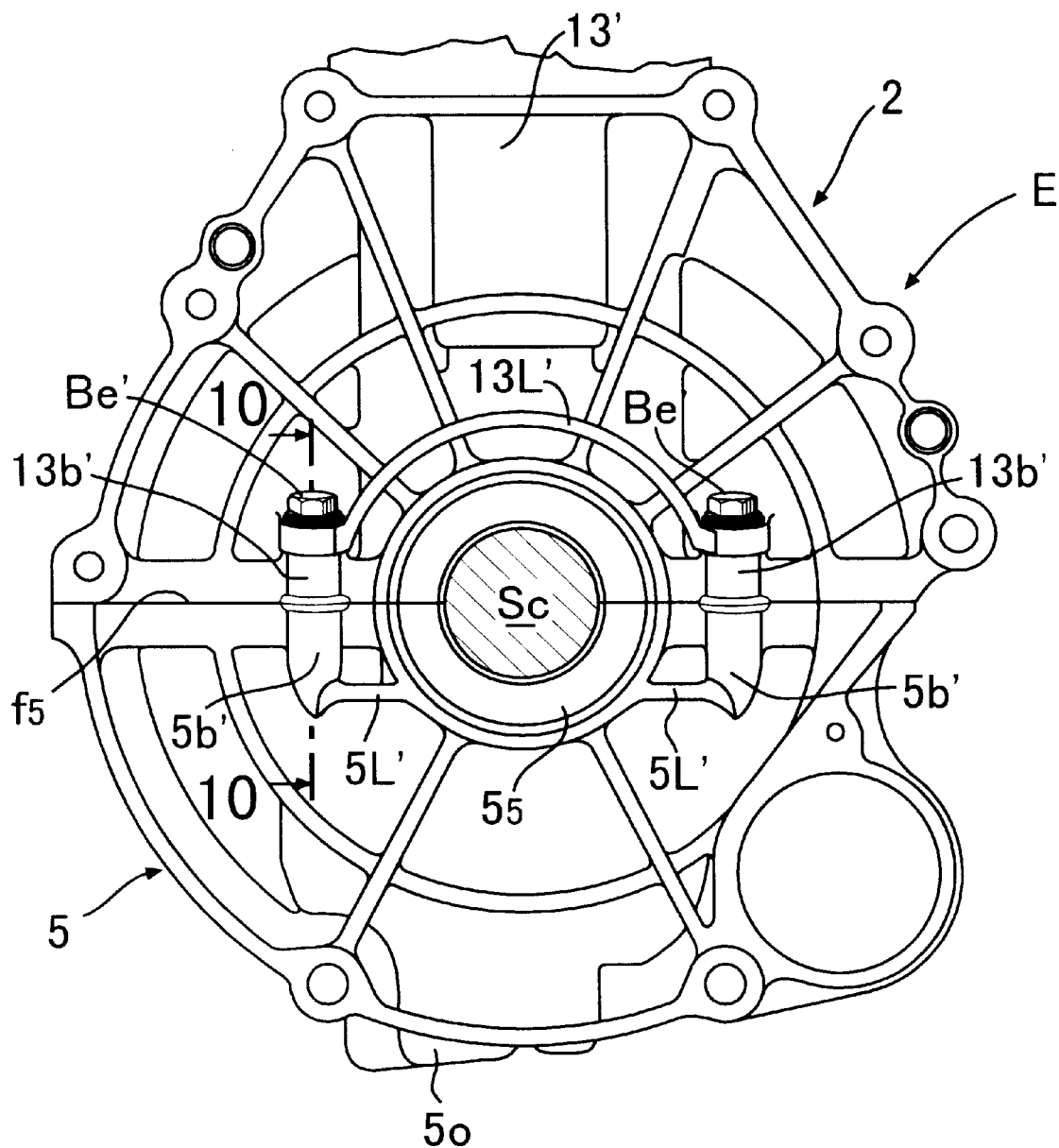
FIG. 9 is an end view of the engine, taken in a direction of an arrow 9 in FIG. 1.
Figure 10:
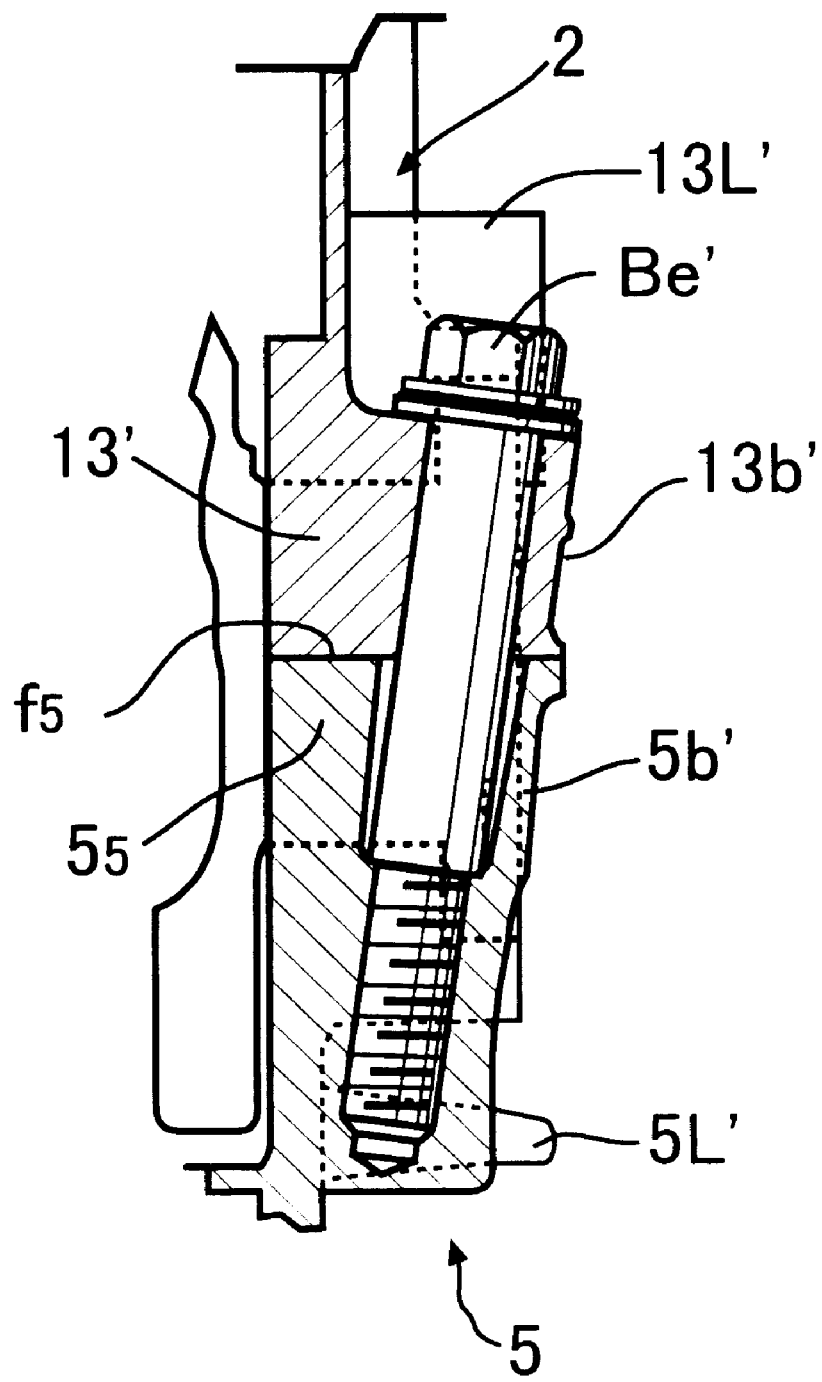
FIG. 10 is a partial enlarged sectional view of the engine, taken along a line 10—10 in FIG. 9.

Since the two adjacent cylinders, e.g., the first and second cylinders $6_1$ and $6_2$ are arranged so that their first and second cylinder axes $L_1$ and $L_2$ intersect each other on the side of the valve operating chamber 8, an interference avoiding notch 21 is defined in the lowermost end edge of each of the cylinders $6_1$ to $6_4$ in order to avoid the interference of a rod portion of the connecting rod Rc with the lowermost end edge of each of the cylinders $6_1$ to $6_4$ adjacent the crank chamber 7 when the connecting rod Rc is moved along a predetermined movement locus, as best shown in FIG. 6. The longitudinal dimension of the notch 21 is set, so that when the piston P reaches the bottom dead center, an oil ring groove Go in the piston does not reach an upper edge of the notch 21, as best shown in FIG. 6.

A water jacket 24 is defined in the cylinder barrel section 2b of the cylinder block 2 to surround the four cylinders $6_1$ to $6_4$. Reinforcing ribs 25 are integrally formed on a longitudinally outer wall of the cylinder barrel section 2b in the axial direction of extension of the crankshaft to connect at least the adjacent cylinders to each other. The reinforcing ribs 25 enable the rigidity of the entire cylinder block 2 to be enhanced more than that of the prior art serial multi-cylinder cylinder block in cooperation with the arrangement of the cylinders.

The cylinder head 3 forming an upper half of the mono-block 1 is provided, as usual, with four combustion chambers 28 above upper surfaces of the pistons, uniflow-type intake ports 29 and uniflow-type exhaust ports 30 which communicate with the combustion chambers 28, and the valve operating chambers 8 above the intake and exhaust ports 29 and 30. An SOHC-type valve operating mechanism Mv is provided in the valve operating chamber 8. The valve operating mechanism Mv includes the valve operating cam shaft 10 which extends in parallel to the crankshaft Sc and is rotatably supported in the cylinder head 3, an intake valve 31 and an exhaust valve 32 adapted to open and close the intake port 29 and the exhaust port 30, and rocker arms 33 and 34 which are connected between a valve operating cam $10_1$ of the valve operating cam shaft 10 and the intake and exhaust valves 31 and 32 to open and close the intake and exhaust valves 31 and 32.

A head cover 35 is mounted to an upper surface of the cylinder head 3 with a packing 27 interposed therebetween.

The lower ends of the first, second, third and fourth cylinders $6_1$, $6_2$, $6_3$ and $6_4$ open toward the crank chamber 7 and hence, the pistons P can be easily inserted from the side of the crank chamber 7 into the four cylinders $6_1$ to $6_4$ and incorporated therein. The center axes of the two adjacent cylinders extend in such directions that they are gradually more spaced apart from each other as proceeding from the side of the valve operating chamber 8 toward the crank chamber 7 as described above. Thus, even if the distance between the two adjacent cylinders, e.g., the first and second cylinders $6_1$ and $6_2$ in the direction of extension of the crankshaft Sc is decreased, a necessary distance can be ensured between the intermediate journal walls 12, whereby a necessary crankshaft bearing area can be ensured, while reducing the length in the direction of arrangement of the cylinders, as compared with the prior art engine. The cylinder center axes of the two adjacent cylinders, e.g., the first and second cylinder center axes $L_1$ and $L_2$ of the first and second cylinders $6_1$ and $6_2$ intersect each other at the axial center O of the valve operating cam shaft 10 and therefore, the head of the cylinder block 2, i.e., the cylinder head 3 can be formed compact. The valve operating mechanism Mv can be formed so that the intake system and the exhaust system are symmetrical with each other, leading to a reduction in number of parts and a simplified structure.

Figure 11:
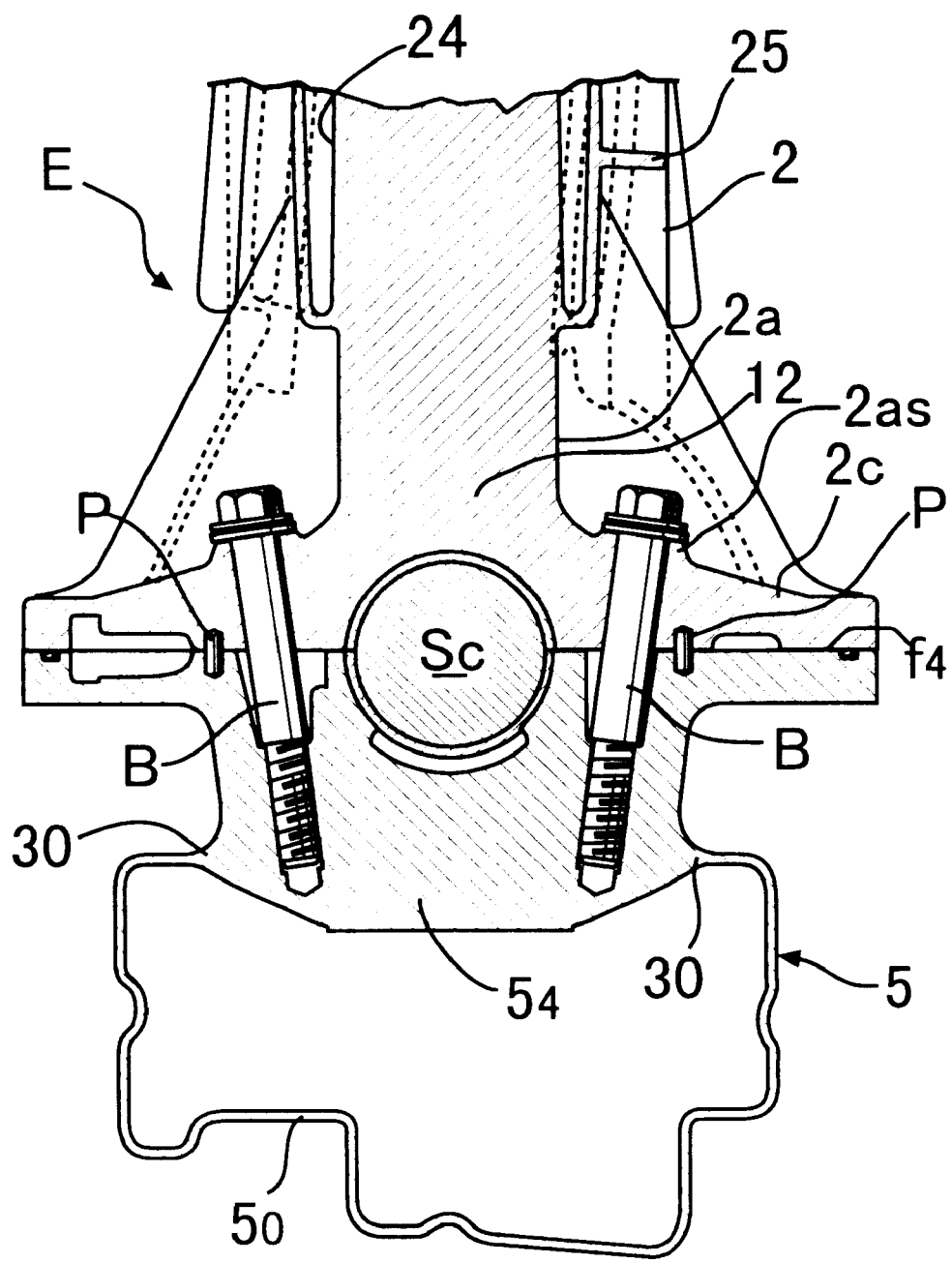
FIGS. 11, 12 and 13 are sectional views similar to FIG. 5, but showing engines according to second, third and fourth embodiments of the present invention, respectively.

A second embodiment of the present invention is shown in FIG. 11. In this embodiment, a positioning pin P is disposed on each of left and right opposite sides of the crankshaft Sc. In other words, the one positioning pin P is disposed at a location laterally symmetrical with the other positioning pin P similar to the positioning pin P provided in the first embodiment with the crankshaft Sc interposed therebetween. Even according to this embodiment, an operating effect similar to that of the first embodiment can be expected.

Figure 12:
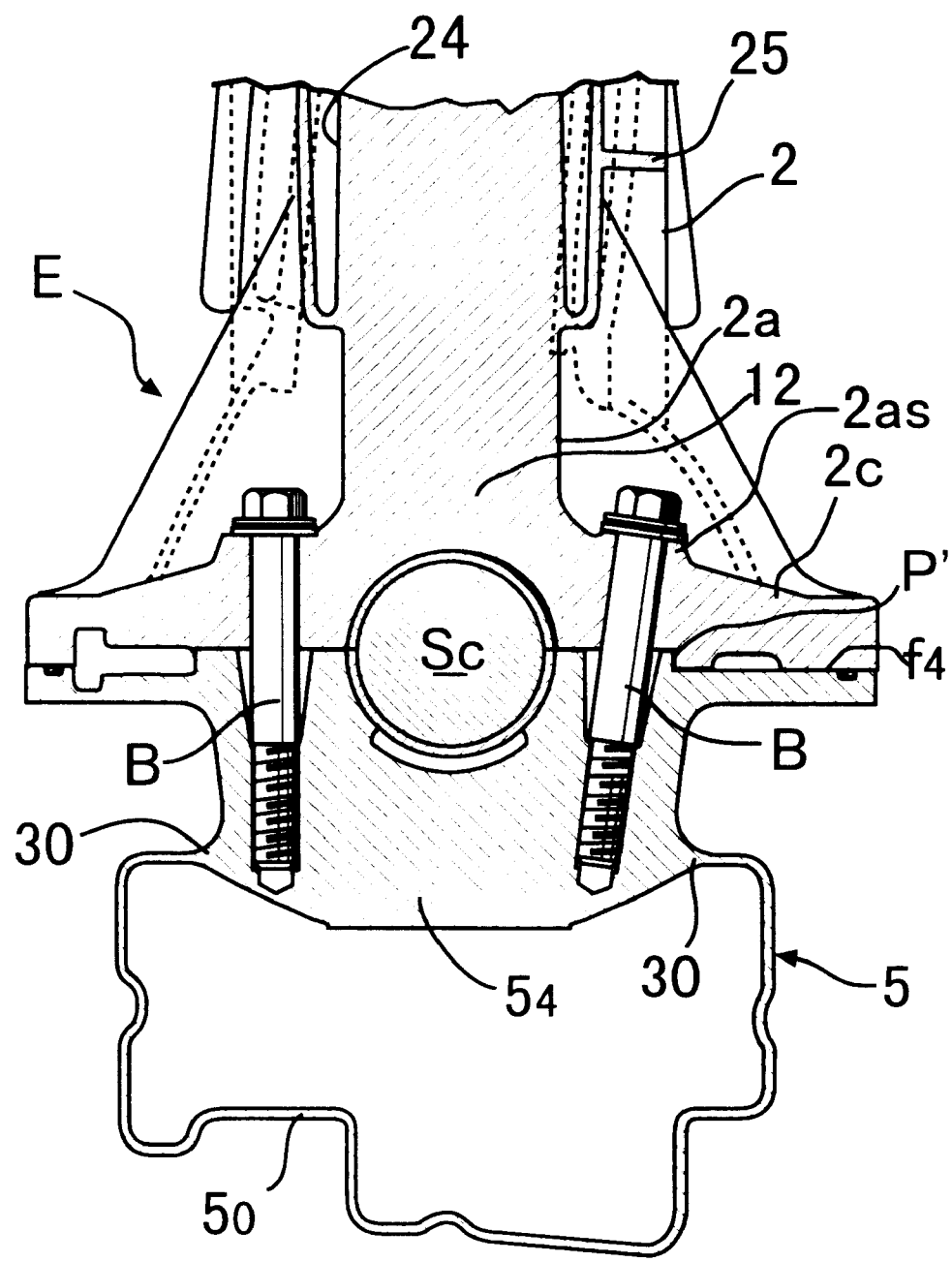

Further, a third embodiment of the present invention is shown in FIG. 12. In this embodiment, in place of the positioning pin P provided in the first embodiment, a single positioning step P' is provided at substantially the same location as the pin P for positioning each of the intermediate journal walls 12 . . . and corresponding one of the bearing caps $5_2$, $5_3$ and $5_4$ in a direction along joint surfaces f of the intermediate journal walls 12 . . . and the corresponding bearing caps $5_2$, $5_3$, $5_4$ (particularly, in a direction traversing the crankshaft Sc. The bolt B nearer the step P' is inclined downwards in an inward direction of the engine with respect to a line perpendicular to the joint surfaces f, so that a lateral (a direction along the joint surfaces $f_2$, $f_3$, $f_4$) component of a bolt tightening force acts on the positioning step P', and the bolt B farther from the step P' is provided perpendicularly to the joint surfaces $f_2$, $f_3$, $f_4$. The inclination of the bolt B as described above ensures that the lateral component of the bolt tightening force acts on the positioning step P' to intensify the engaging force of the step P', thereby effectively exhibiting the function of positioning of the step P'. Therefore, it is possible to properly position the intermediate journal wall 12 and the bearing caps $5_2$, $5_3$, $5_4$ along their joint surfaces $f_2$, $f_3$, $f_4$, namely, an effect similar to that in the previous embodiment can be expected. In assembling the engine, the bolt B nearer the positioning step P' is tightened from above the outside of the cylinder block 2 prior to the other bolt B (farther from the step P') in each of the joint surfaces $f_2$, $f_3$, $f_4$ of the intermediate journal walls 12 . . . and the bearing caps $5_2$, $5_3$, $5_4$, so that a positioning effect by the step P' is effectively exhibited. Other constructions are similar to those in the previous embodiment and hence, the same reference characters as those in the previous embodiment are only affixed to the corresponding portions or components, and the detailed description of the structure is omitted.

Figure 13:
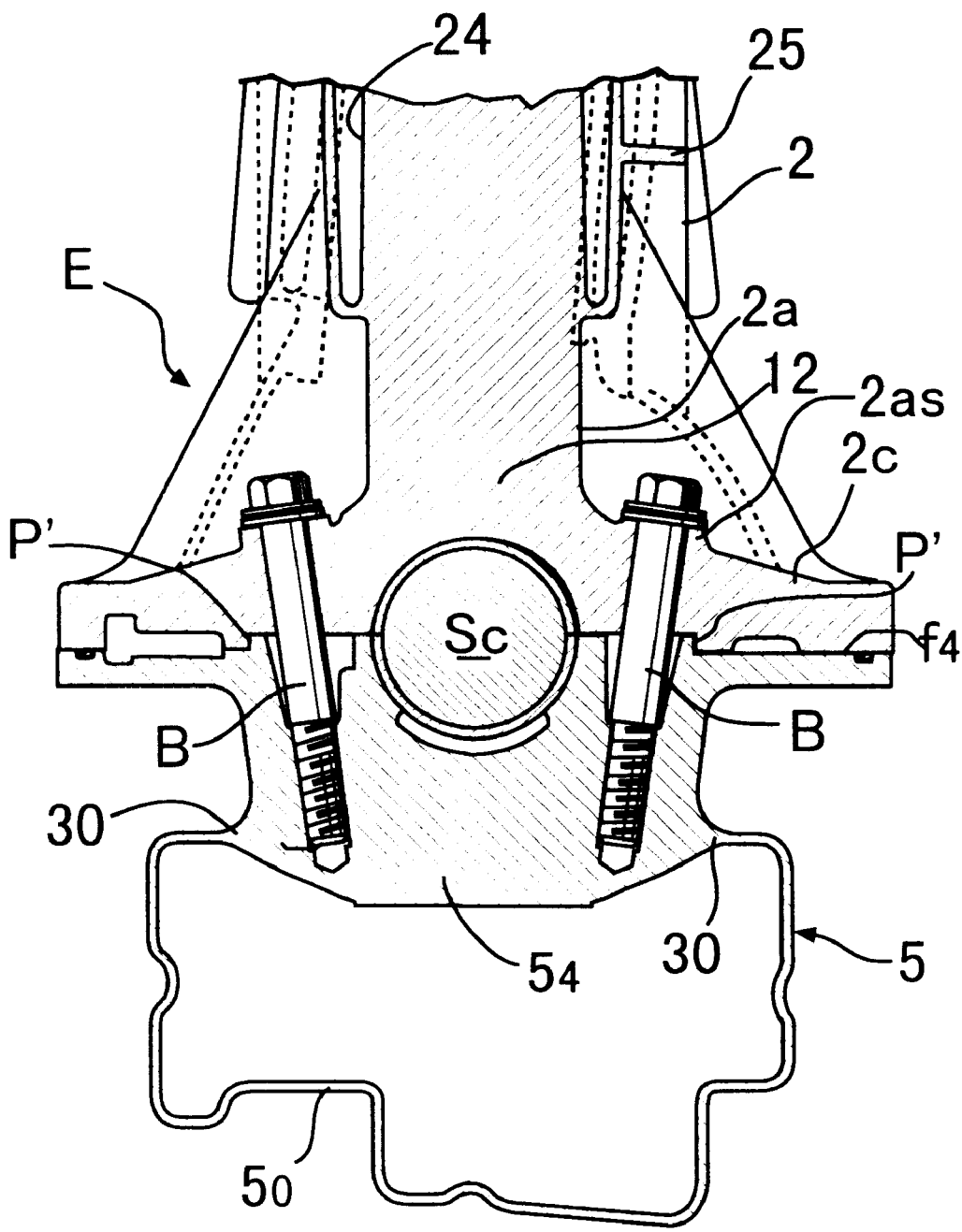

A fourth embodiment of the present invention is shown in FIG. 13. In this embodiment, the positioning step P' is disposed on each of left and right opposite side of the crankshaft Sc. In other words, the one positioning step P' is disposed at a location laterally symmetrical with the other positioning step P' similar to the positioning step P' provided in the third embodiment with the crankshaft Sc interposed therebetween, and the bolt B corresponding to the step P' is also inclined. Even according to this embodiment, an operating effect similar to that in the third embodiment can be expected.

Although the embodiments of the present invention have been described in detail, it will be understood that the present invention is not limited to the above-described embodiments, and various modifications may be made without departing from the spirit and scope of the invention defined in claims. For example, the present invention has been described as being carried out in the four-cylinder serial-type engine, but, of course, may be carried out in another multi-cylinder engine. In addition, the present invention has been described as being carried out in the engine having the mono-block structure including the cylinder block and the cylinder head formed integrally with each other, but may be carried out in another multi-cylinder engine in which pistons are assembled in the cylinder block from the side of a crankcase. Further, not only the bolt B nearer the positioning pin P but also the bolt B farther from the positioning pin P has been inclined in the first embodiment, but the bolt B farther from the positioning pin P may be provided perpendicular to the joint surfaces f.

What is claimed is:

1. An engine block structure in an in-line type multi-cylinder engine, comprising a cylinder block, a cylinder head, and a crankshaft, wherein pistons are incorporated into a corresponding plurality of cylinders provided in series in said cylinder block from a side of a crank chamber, wherein said cylinders are arranged to overlap at least partially with each other as viewed in an axial direction of said crankshaft, and cylinder axes of two adjacent ones of said cylinders extend in such directions that the cylinder axes are gradually spaced apart from each other as proceeding from a valve operating chamber toward the crank chamber as viewed from said axial direction of said crankshaft wherein the cylinder axes of the two adjacent cylinders intersect each other on an axial center of a valve operating cam shaft of a valve operating mechanism provided in said cylinder head.

2. An engine block structure in an in-line type multi-cylinder engine according to claim 1, wherein said cylinder block and said cylinder head are formed into an integral structure.

3. An engine block structure in an in-line type multi-cylinder engine according to claim 2, further including a reinforcing rib integrally provided on a sidewall of said cylinder block for coupling at least the two adjacent cylinders to each other.

4. An engine block structure in an in-line type multi-cylinder engine according to claim 2, further including an arcuate recess that allows passing of said piston through said recess, said recess being defined in each of journal walls of said cylinder block supporting said crankshaft in order to assemble the piston into each of said cylinders from the side of the crank chamber.

5. An engine block structure in an in-line type multi-cylinder engine comprising a cylinder block, a cylinder head, and a crankshaft, wherein pistons are incorporated into a corresponding plurality of cylinders provided in series in said cylinder block from a side of a crank chamber, wherein said cylinders are arranged to overlap at least partially with each other as viewed in an axial direction of said crankshaft, and cylinder axes of two adjacent ones of said cylinders extend in such directions that the cylinder axes are gradually spaced apart from each other as proceeding from a valve operating chamber toward the crank chamber as viewed from said axial direction of said crankshaft further including an oil return passage or a blow-by gas passage defined in said cylinder block on a side of said crankshaft opposite the cylinders.

6. An engine block structure in an in-line type multi-cylinder engine according to claim 5, wherein said cylinder block and said cylinder head are formed into an integral structure.

7. An engine block structure in an in-line type multi-cylinder engine according to claim 6, further including an arcuate recess that allows passing of said piston through said recess, said recess being defined in each of journal walls of said cylinder block supporting said crankshaft in order to assemble the piston into each of said cylinders from the side of the crank chamber.

8. An engine block structure in an in-line type multi-cylinder engines according to claim 6, further including a reinforcing rib integrally provided on a sidewall of said cylinder block for coupling at least the two adjacent cylinders to each other.

9. An engine block structure in an in-line type multi-cylinder engine comprising a cylinder block, a cylinder head, and a crankshaft, wherein pistons are incorporated into a corresponding plurality of cylinders provided in series in said cylinder block from a side of a crank chamber, wherein said cylinders are arranged to overlap at least partially with each other as viewed in a axial direction of said crankshaft, and cylinder axes of two adjacent ones of said cylinders extend in such directions that the cylinders axes are gradually spaced apart from each other as proceeding from a valve operating chamber toward the crank chamber as viewed from said axial direction of said crankshaft further including an arcuate recess that allows passing of said piston through said recess, said recess being defined in each of journal walls of said cylinder block supporting said crankshaft in order to assemble the piston into each of said cylinders from the side of the crank chamber.

10. An engine block structure in an in-line type multi-cylinder engine according to claim 6, wherein the cylinder axes of the two adjacent cylinders intersect each other on an axial center of a valve operating cam shaft of a valve operating mechanism provided in said cylinder head.

11. An engine block structure in an in-line type multi-cylinder engine according to claim 9, wherein said cylinder block and said cylinder head are formed into an integral structure.

12. An engine block structure in an in-line type multi-cylinder engines according to claim 9, further including a reinforcing rib integrally provided on a sidewall of said cylinder block for coupling at least the two adjacent cylinders to each other.

13. An engine block structure in an in-line type multi-cylinder engine comprising a cylinder block, a cylinder head, and a crankshaft, wherein pistons are incorporated into a corresponding plurality of cylinders provided in series in said cylinder block from a side of a crank chamber, wherein said cylinders are arranged to overlap at least partially with each other as viewed in an axial direction of said crankshaft, and cylinder axes of two adjacent ones of said cylinders extend in such directions that the cylinder axes are gradually spaced apart from each other as proceeding from a valve operating chamber toward the crank chamber as viewed from said axial direction of said crankshaft wherein joint surfaces of at least a part of journal walls integrally provided at a lower portion of said cylinder block and bearing caps coupled to lower ends of said walls are fastened to each other by a plurality of bolts passing through said joint surfaces, and wherein said crankshaft is rotatably supported between said joint surfaces, and a positioning pin or step is provided between said joint surfaces of each of said journal walls and each of said bearing caps for positioning the journal wall and said bearing cap relative to each other in a direction along said joint surfaces, at least one of said bolts being inclined with respect to a line perpendicular to said joint surfaces, so that a lateral component of a bolt tightening force acts on said positioning pin or step.

14. An engine block structure in an in-line type multi-cylinder engines according to claim 13, further including a reinforcing rib integrally provided on a sidewall of said cylinder block for coupling at least the two adjacent cylinders to each other.

15. An engine block structure in an in-line type multi-cylinder engine comprising a cylinder block, a cylinder head, and a crankshaft, wherein pistons are incorporated into a corresponding plurality of cylinders provided in series in said cylinder block from a side of a crank chamber, wherein said cylinders are arranged to overlap at least partially with each other as viewed in an axial direction of said crankshaft, and cylinder axes of two adjacent ones of said cylinders extend in such directions that the cylinder axes are gradually spaced apart from each other as proceeding from a valve operating chamber toward the crank chamber as viewed from said axial direction of said crankshaft wherein joint surfaces of at least a part of journal walls integrally provided at a lower portion of said cylinder block and bearing caps coupled to lower ends of said walls are fastened to each other by a plurality of bolts passing through said joint surfaces from above the outside of said cylinder block, and wherein said crankshaft is rotatably supported between said joint surfaces, and a positioning pin or step is provided between said joint surfaces of each of said journal walls and each of said bearing caps for positioning the journal wall and said bearing cap relative to each other in a direction along said joint surfaces, at least one of said bolts being inclined downwards in an inward direction of the engine with respect to a lie perpendicular to said joint surfaces, so that a lateral component of a bolt tightening force acts on said positioning pin.

16. An engine block structure in an in-line type multi-cylinder engine according to claim 15, wherein said bearing caps are integrally coupled to an oil pan body, and at least one of the bolts is disposed at a location nearer said crankshaft than the coupled portion of said bearing cap.

17. An engine block structure in an in-line type multi-cylinder engines according to claim 15, further including a reinforcing rib integrally provided on a sidewall of said cylinder block for coupling at least the two adjacent cylinders to each other.

18. An engine block structure in an in-line type multi-cylinder engine comprising a cylinder block, a cylinder head, and a crankshaft, wherein pistons are incorporated into a corresponding plurality of cylinders provided in series in said cylinder block from a side of a crank chamber, wherein said cylinders are arranged to overlap at least partially with each other as viewed in an axial direction of said crankshaft, and cylinder axes of two adjacent ones of said cylinders extend in such directions that the cylinder axes are gradually spaced apart from each other as proceeding from a valve operating chamber toward the crank chamber as viewed from said axial direction of said crankshaft further including a plurality of journal walls arranged at distances in said axial direction of said crankshaft and integrally connected to a lower portion of said cylinder block, lower ends of said plurality of journal walls being coupled to a plurality of bearing caps corresponding to said journal walls, and wherein said crankshaft is rotatably supported between joint surfaces of said journal walls and said bearing caps, and the joint surface of the journal wall located at least at one end in the axial direction of said crankshaft and said bearing cap are coupled to each other from above by bolts which are inclined downwards in an inward direction of the engine with respect to a line perpendicular to said joint surfaces.

19. An engine block structure in an in-line type multi-cylinder engine according to claim 18, wherein all said joint surfaces of said bearing caps and said journal walls corresponding to said bearing caps are coupled to each other from above by the bolts which are inclined downwards in the inward direction of the engine with respect to the line perpendicular to said joint surfaces.

20. An engine block structure in an in-line type multi-cylinder engine according to claim 18, wherein one end face of an engine body including said cylinder block and said cylinder head is covered with a chain case in which a chain transmitting mechanism for driving auxiliaries is accommodated, and wherein a bolt boss corresponding to an outer periphery of a shank of said bolt is projectingly provided on an outer surface of said bearing cap facing the inside of the chain case, and a chain guide is mounted to the bolt boss.

21. An engine block structure in an in-line type multi-cylinder engine according to claim 18, wherein the bearing cap located at least at one end in the axial direction of said crankshaft includes a plurality of bolt bosses corresponding to outer peripheries of shanks of said bolts, and a rib interconnecting said bolt bosses, said bolt bosses and said rib being projectingly provided on an outer surface of said bearing cap.

22. An engine block structure in an in-line type multi-cylinder engine according to claim 18, wherein the journal wall located at least at one end in the axial direction of said crankshaft includes a plurality of bolt bosses which correspond to outer peripheries of shanks of said bolts and whose upper ends serve as bolt seat faces, and a rib interconnecting said bolt bosses, said bolt bosses and said rib being projectingly provided on an outer surface of said journal wall.

\* \* \* \* \*